United States Patent [19]

Wilhelmson

[11] 4,424,930

[45] Jan. 10, 1984

[54] CARBON-BASED SOLDERING AND DE-SOLDERING TIP AND METHOD OF MANUFACTURING SAME

[75] Inventor: Jack L. Wilhelmson, Cheraw, S.C.

[73] Assignee: Cooper Industries, Inc., Houston, Tex.

[21] Appl. No.: 278,408

[22] Filed: Jun. 29, 1981

[51] Int. Cl.³ ............................................. B23K 3/02
[52] U.S. Cl. .................................... 228/20; 29/527.4; 204/15; 204/41; 228/54
[58] Field of Search ..................... 228/20, 44.1 A, 54, 228/55; 29/527.4; 204/15, 41

[56] References Cited

U.S. PATENT DOCUMENTS

| | | | |
|---|---|---|---|
| 750,239 | 1/1904 | Bowen | 219/239 |
| 1,880,940 | 10/1932 | Enninga | 228/55 |
| 2,747,074 | 5/1956 | Finch | 219/237 |
| 2,951,927 | 9/1960 | Weller | 219/241 |
| 3,109,231 | 11/1963 | Johnson | 228/54 X |
| 3,125,055 | 3/1964 | Lerner | 228/54 |
| 3,245,599 | 4/1966 | Johnson | 228/54 |
| 3,287,541 | 11/1968 | Weller et al. | 228/55 |
| 3,315,350 | 4/1967 | Kent | 228/54 X |
| 3,410,472 | 11/1968 | Weller et al. | 228/51 |
| 3,646,577 | 2/1972 | Ernst | 228/51 X |
| 3,917,148 | 11/1975 | Runyon | 228/55 X |
| 4,049,506 | 9/1977 | Gilding | 228/54 X |

FOREIGN PATENT DOCUMENTS 684612 12/1939 Fed. Rep. of Germany ........ 228/54
547303 8/1942 United Kingdom ................ 228/54

OTHER PUBLICATIONS

Abstract of Application Ser. No. 82,457 Published in Official Gazette of the U.S. Patent Office, vol. 637, p. 1576, Aug. 1950.

Primary Examiner—Kenneth J. Ramsey
Attorney, Agent, or Firm—Finnegan, Henderson, Farabow, Garrett & Dunner

[57] ABSTRACT

A soldering or de-soldering tip and method of manufacturing a soldering or de-soldering tip which has a carbon-based body with an attachment portion, an intermediate portion adjoining the attachment portion, and a solder-wetting portion adjoining the intermediate portion. The solder-wetting portion has an exterior coating of iron to provide a wettable working surface, and the intermediate portion has an exterior coating of chrome for localizing the wettable working surface and impeding the upward flow of solder along the intermediate portion and toward the attachment portion. The carbon-based body eliminates premature failure problems caused by the pitting and oxidation of standard copper-based tips.

18 Claims, 11 Drawing Figures

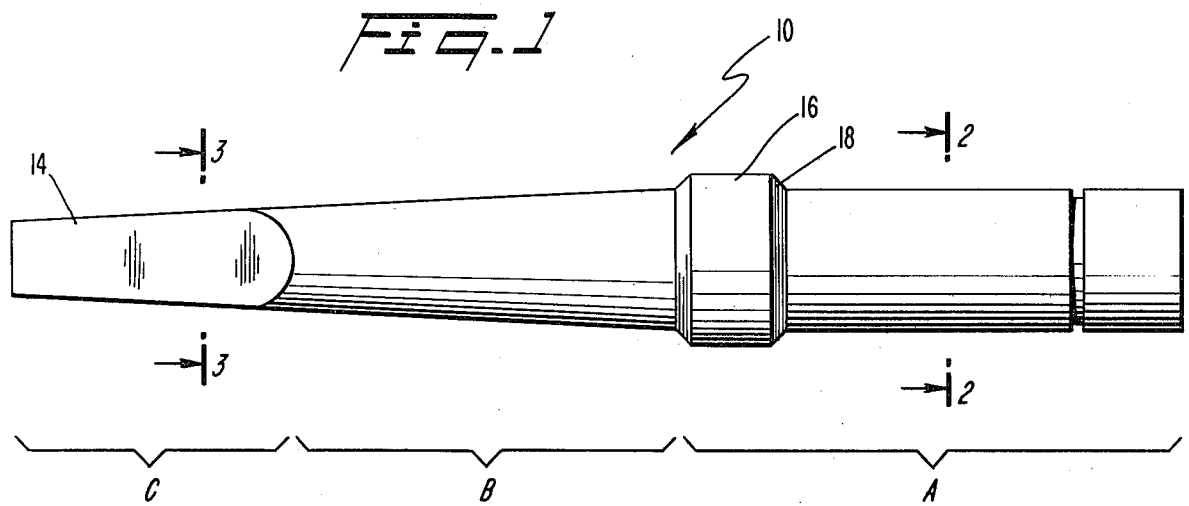
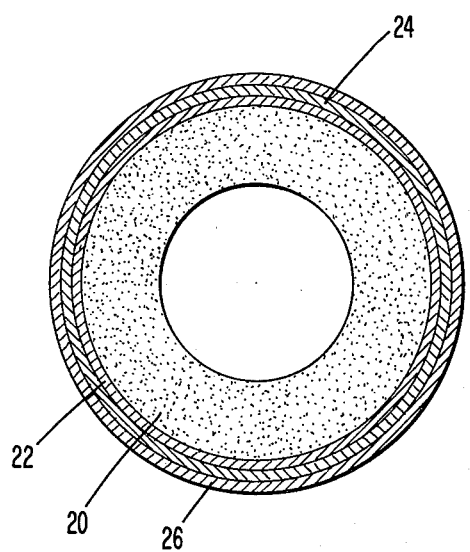
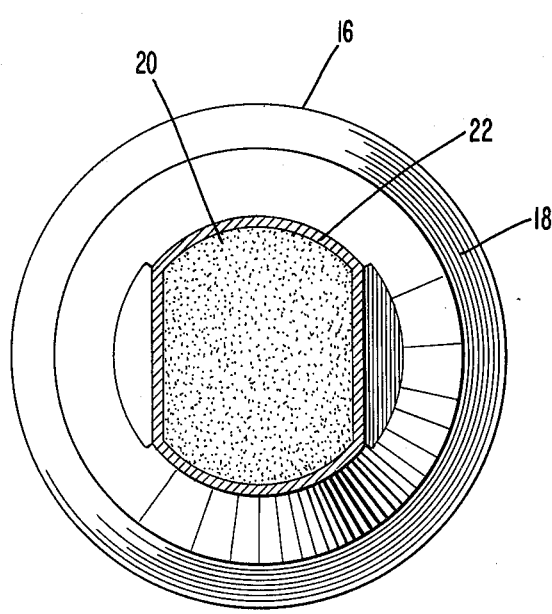

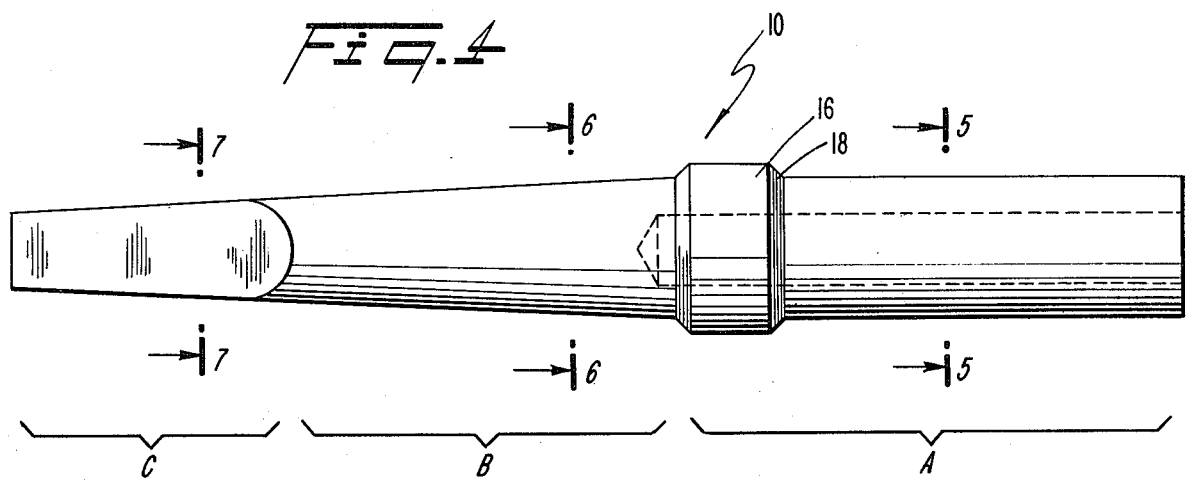
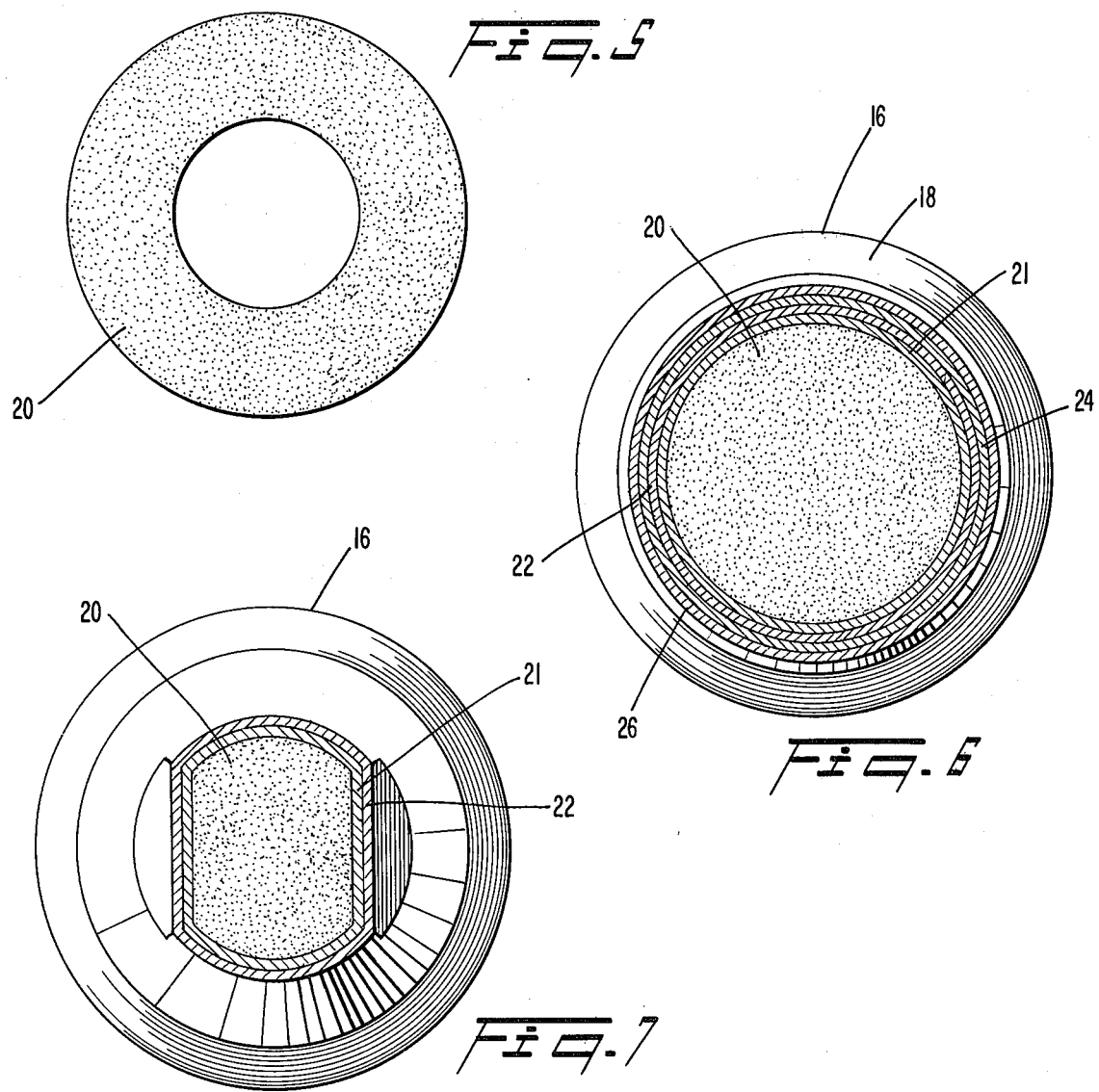

CARBON-BASED SOLDERING AND DE-SOLDERING TIP AND METHOD OF MANUFACTURING SAME

BACKGROUND OF THE INVENTION

1. Field of the Invention

The present invention relates to a carbon-based soldering or de-soldering tips for use with soldering irons and de-soldering tools, respectively. The tip includes plated soldering surfaces. More particularly, the invention is directed to replaceable soldering and de-soldering tips which are less expensive than standard copper tips, have longer working lives, resist pitting, and eliminate or greatly reduce the problems associated with standard soldering tips. The invention further relates to a method for manufacturing carbon-based soldering and de-soldering tips. The tips are resistent to both high temperatures and corrosion and can be used with all types of soldering irons and de-soldering tools, including temperature-controlled soldering irons and de-soldering tools.

2. Description of the Prior Art

It is well-known that all soldering irons have soldering tips, and the majority of soldering irons are adapted to receive replaceable soldering tips. Replaceable tips are normally inserted into a tip-receiving bore of a soldering iron and are threaded or fixed in place by a set screw or similar mechanical device. It is further known that many temperature-controlled soldering irons include a sensor element extending within the iron's tip-receiving bore. The sensor element fits within a portion of a permanent or replaceable soldering iron tip.

It is also well-known that de-soldering tools have replaceable de-soldering tips which are normally screw-threaded to the tool. These tips include a central tubular vacuum passage through which the melted solder is drawn.

Soldering and de-soldering tips have conventionally been formed from a copper body due, in part, to the heat conductivity of such copper bodies. This standard use of copper as a body of these tips has, however, presented a number of problems. Whenever copper comes into contact with commonly used solders, the solder reacts with the copper and dissolves it. Therefore, copper tips must be plated at least in the solder-wetting portion of the tips. Furthermore, the tubular vacuum passage of a de-soldering tip must be plated or otherwise protected from contact with the melted solder. If it is not, the passage becomes clogged. The plating of the copper base, however, does not completely solve the problem since the coatings wear over time and most often initially have slight imperfections and cracks. Heated solder seeps through such imperfections and worn areas and dissolves the copper base, resulting in cavities in the tip similar to tooth cavities. Thus, copper-based tips often lose their shape and effectiveness after a short period of use.

The use of copper as the base of soldering and de-soldering tips presents an additional and significant problem. Copper, when subjected to the high temperature necessary for soldering or de-soldering, quickly oxidizes. This oxidation damages a tip's surface and, more importantly, often results in a freezing of a replaceable tip to the body of the soldering iron or de-soldering tool at the interface of the tip and the tip-receiving bore. Furthermore, if a soldering iron has a temperature sensor inserted into a bore in the tip, the tip and the temperature sensor often freeze together. This freezing of parts damages the soldering iron itself and often necessitates repair or renders the iron completely unuseable.

The oxidation of a copper tip poses an additional heat transfer problem with soldering tips. To insure proper heat transfer between the heating element and the shank of the soldering tip, the shank must fit snugly in the opening of the heating element. However, the shank of the soldering tip oxidizes at elevated temperatures. The resultant layer of oxide at the interface of the shank and the soldering iron acts as an insulator which decreases the transfer efficiency between the heating element and the soldering tip.

With temperature-controlled soldering irons, the oxidation tends to decrease the sensitivity of control. For the heat sensor to measure the tip temperature accurately, it must fit snugly within the sensor hole. However, the oxidation of the copper at the sensor-tip interface decreases the heat transfer and sensitivity of the control and often chases the tip to freeze to the sensor. This freezing problem is so significant that in most commercial applications the bore receiving the sensor is oversized to eliminate or reduce the freezing. This procedure, however, decreases heat transfer and thus the sensitivity of the temperature control.

One technique used to overcome the freezing problem at the interface of the tip and soldering iron has been to form a stainless steel sleeve over the portion of the copper tip which is received by the soldering iron. While such a stainless steel sleeve has been effective in reducing the freezing problem at the tip-iron interface, the heat transfer properties of the tip are greatly reduced because there is no molecular bond between the stainless steel and the copper. Furthermore, this technique is expensive and does not correct the freezing problem presented at the sensor-tip interface in temperature-controlled soldering irons.

With respect to the foregoing problem at the sensor-tip interface, it has been found that it is difficult, if not impossible, to electroplate the inside of the sensor hole without very expensive individual handling of the tips. Applicant is not aware of any presently available means to economically overcome this freezing problem.

With respect to de-soldering tips, the tubular vacuum passages now on the market often include a stainless steel lining which will not react with the melted solder and can be easily cleaned. Such linings significantly add to the expense of such de-soldering tips.

Because of the miniaturization presently occurring in the electronics field, soldering and de-soldering tips in many applications have decreased substantially in size to permit precise soldering. The demand for smaller soldering tips aggravates the problems presented by the pitting and oxidation of copper-based tips.

Finally, the increasing cost of copper has made copper soldering and de-soldering tips less commercially desirable. The short service life of copper tips increases this expense.

SUMMARY OF THE INVENTION

It is therefore an object of the present invention to provide a soldering or de-soldering tip which overcomes the pitting and oxidation problems presented by commercial tips now on the market. It is further an object of the present invention to provide a method of manufacturing such tips.

It is another object to provide soldering or de-soldering tips and a method of manufacturing such tips which are less expensive and have longer working lives than currently available tips and processes.

Another object is to provide a soldering or de-soldering tip having a body which will not dissolve when contacted with solder and will not oxidize at high temperatures.

It is also an object of the present invention to provide a soldering or de-soldering iron tip which can, without freezing, be sized to snugly fit within the tip-receiving bore of a soldering iron and which can snugly accept a temperature sensor of a temperature-controlled soldering iron.

Another object is to provide a de-soldering tip which does not require that its tubular vacuum passage be plated or lined with an additional sleeve of material.

Additional objects and advantages of the invention will be set forth in part in the description which follows and in part will be obvious from the description, or may be learned by practice of the invention. The objects and advantages of the invention are realized and obtained by means of the instruments and the combinations particularly pointed out in the appended claims.

To achieve the objects and in accordance with the purpose of the invention, as embodied and broadly described herein, the invention comprises a tip for a soldering iron or a de-soldering tool comprising a carbon-based body having an attachment portion, an intermediate portion adjoining said attachment portion, and a solder-wetting portion adjoining said intermediate portion, first means coated on at least the solder-wetting portion for providing a wettable surface, and second means coated over at least the intermediate portion, but not the solder-wetting portion, for localizing the wettable working surface and impeding the upward flow of solder along said intermediate portion and toward the attachment portion.

As embodied and broadly described herein, the invention also comprises a method of manufacturing tips for a soldering iron or a de-soldering tool comprising the steps of forming a soldering tip carbon-based body having an attachment portion, an intermediate portion adjoining said attachment portion, and a solder-wetting portion adjoining said intermediate portion, electroplating at least the intermediate portion and the solder-wetting portion with a coating of iron, electroplating at least the intermediate portion with a coating of nickel over said iron coating, electroplating at least the intermediate portion with a coating of chrome over said nickel coating, and stripping the solder-wetting portion of any nickel or chrome coatings to expose the iron coating as a wetting surface.

It is to be understood that both the foregoing general description and the following detailed description are exemplary and explanatory only and are not restrictive of the invention, as claimed.

The accompanying drawings, which are incorporated in and constitute a part of the specification, illustrate an example of a preferred embodiment of the invention and together with the description serve to explain the principles of the invention.

BRIEF DESCRIPTION OF THE DRAWINGS

FIG. 1 is a side view illustrating one embodiment of the invention.

FIG. 2 is an enlarged cross-sectional view taken along lines 2—2 of FIG. 1.

FIG. 3 is an enlarged cross-sectional view taken along the lines 3—3 of FIG. 1.

FIG. 4 is a side view illustrating a second preferred embodiment of the invention.

FIG. 5 is an enlarged cross-sectional view taken along the lines 5—5 of FIG. 4.

FIG. 6 is an enlarged cross-sectional view taken along the lines 6—6 of FIG. 4.

FIG. 7 is an enlarged cross-sectional view taken along the lines 7—7 of FIG. 4.

DETAILED DESCRIPTION OF THE INVENTION

Figure 8:
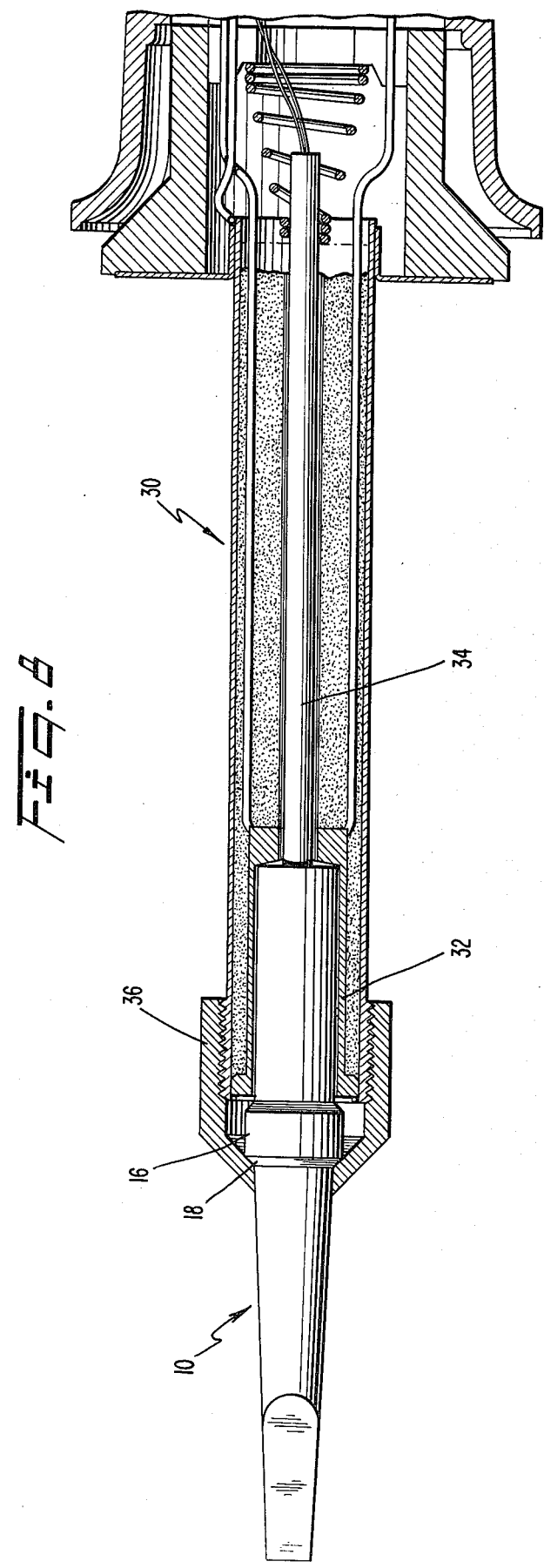
FIG. 8 is a side view showing an embodiment of the invention fixed in a temperature-controlled electric soldering iron.

Reference will now be made in detail to the present preferred embodiments of the invention, examples of which are illustrated in the accompanying drawings.

FIG. 1 is a side illustration of one embodiment of a soldering tip made according to the present invention. The soldering iron tip shown in FIG. 1 and designated generally as numeral 10 includes a shank or attachment portion A, an intermediate portion B adjoining the attachment portion A, and a solder-wetting portion C adjoining the intermediate portion B. In use, the shank or attachment portion A is inserted into a bore in the heating element of a soldering iron, as shown generally in FIG. 8. The soldering tip 10 may include a ferrite iron heat sensing element or magnestat 12 fixed to the distal end of the attachment portion A. When the soldering tip 10 is inserted in a soldering iron the magnestat contacts with a temperature sensing device in the soldering iron. The attachment portion A is preferentially cylindrical in shape, and the tip 10 tapers generally along the intermediate portion B and the solder-wetting portion C. The working end 14 of the tip 10 can be formed in a shape most beneficial to the particular application for which the tip is designed. If desired, the tip can include a shoulder 16 with bevel edges 18. This shoulder acts as a stop to properly position the tip 10 within a soldering iron and also serves as a barrier to stop any possible upward flow of solder from the solder-wetting portion C toward the attachment portion A.

As shown by the cross-sectional view of FIG. 2, the solder tip has an integral carbon-based body 20. Preferably, the carbon-based body can be made from pure carbon, carbon graphite, pyrolytic carbon or silicon carbide. The applicant has found that each of these above carbon-based materials provides an acceptable soldering or de-soldering tip base with sufficient heat conductivity. It is believed that other carbon-based materials may be likewise acceptable.

The thermal conductivity of the carbon materials, as well as the costs, varies from material to material. Presently, applicant considers carbon graphite to be the preferred body material for most commercial applications. Carbon graphite has sufficient heat conductivity and is low in cost. Carbon graphite has a thermal conductivity which approximates 60% of the normal thermal conductivity of pure copper and costs ⅛ to 1/5 as much. In special applications, other carbon-based materials may be more appropriate. For example, if increased heat conductivity is desired, pyrolytic carbon can be fashioned to provide a much better thermal conductivity than copper. The cost of pyrolytic carbon, however, is 3-5 times as much as copper.

The carbon-based body provides several advantages over copper and other known base materials for soldering and de-soldering tips. Carbon does not dissolve when placed in contact with solders. Furthermore, the carbon does not oxidize or react with other elements at high temperatures and does not have a liquid state. Furthermore, carbon-based materials are easily fabricated on standard machine tools, often at lesser costs than copper. Finally, as will be explained below, the carbon-based body readily accepts platings of metals during a plating process.

In the embodiment shown in FIG. 1, FIG. 2 and FIG. 3, the soldering tip includes a coating of iron 22 formed over the entire exterior body of the tip. A coating of nickel plating 24 is formed over the iron coating 22 along the intermediate portion B and the attachment portion A, but not along the solder-wetting portion C. Finally, a coating 26 of chromium is formed over the nickel plating 24 along the intermediate portion B and the attachment portion A, but not along the solder-wetting portion C.

The iron coating 22 provides a wettable surface in the working area 14 of the tip. The nickel-chrome coating localizes the wettable working surface so that precision soldering can be achieved. The nickel-chrome coating also impedes the upward flow of solder along the intermediate portion B and toward the attachment portion A. Without the coating, solder would flow to the point where the soldering tip and soldering iron meet and might bond the tip and iron together.

In the embodiment shown in FIG. 1, the attachment portion includes the exterior coatings of iron, nickel and chrome. The resultant carbon-based tip is not subject to the degree of oxidation that a copper-based tip is, since the carbon-based material will not oxidize. As will be described below, it is possible to further reduce the oxidation problems by stripping all coatings from the attachment portion A so that only uncoated, bare carbon-based material interfaces with the solderng iron.

A second embodiment of a soldering tip made according to the invention is shown in FIG. 4, FIG. 5, FIG. 6, and FIG. 7, wherein like numbers are used to refer to like parts. The soldering tip 10 shown in FIG. 4 includes an elongated bore 19 formed in the attachment portion A and sized to receive snugly a temperature-sensing element of a soldering iron. The soldering tip in FIG. 4 is similar to the tip in FIG. 1 and includes a carbon-based body 20, an iron coating 22, a nickel coating 24, and a chrome coating 26. In addition, the tip includes a thin coating of dull nickel 21 formed between the carbon-based body 20 and the iron coating 22 along the intermediate portion B and the solder-wetting portion C. As will be described below, the thin coating of dull nickel is necessary only when the tips are coated by a barrel plating process, rather than a rack plating process. The primary distinction between the embodiment shown in FIG. 1 and FIG. 4 is that the attachment portion A does not include any metal coatings in the finished product. Furthermore, there is no coating on the inner surface of the elongated bore 19. This embodiment is the present preferred embodiment of a soldering tip made in accordance with the invention and prevents any possible oxidation or freezing of the attachment portion A to the soldering iron or to the temperature-sensing element of the soldering iron.

In the preferred embodiment, the coating of iron has a thickness in the range of 6 to 10 mils, the outer coating of nickel has a thickness in the range of 0.05 to 1 mils, and the coating of chrome has a thickness in the range of 0.5 to 1 mils. If an inner coating of dull nickel is used, that coating is approximately 0.5 mils thick.

FIG. 8 illustrates an embodiment of the present invention attached to a temperature-controlled soldering iron with a temperature-sensing element. The soldering iron includes a general body portion 30 with a tip-receiving bore 32. Within the tip-receiving bore 32 is a sensor element 34 for sensing the temperature of the soldering tip. When the soldering tip 10 is inserted into the bore 32 of soldering iron 30, the sensor 34 is snugly received by the elongated bore 19. A tip nut 36 or a similar mechanical device is used to fix or lock the tip to the soldering iron.

Figure 9:
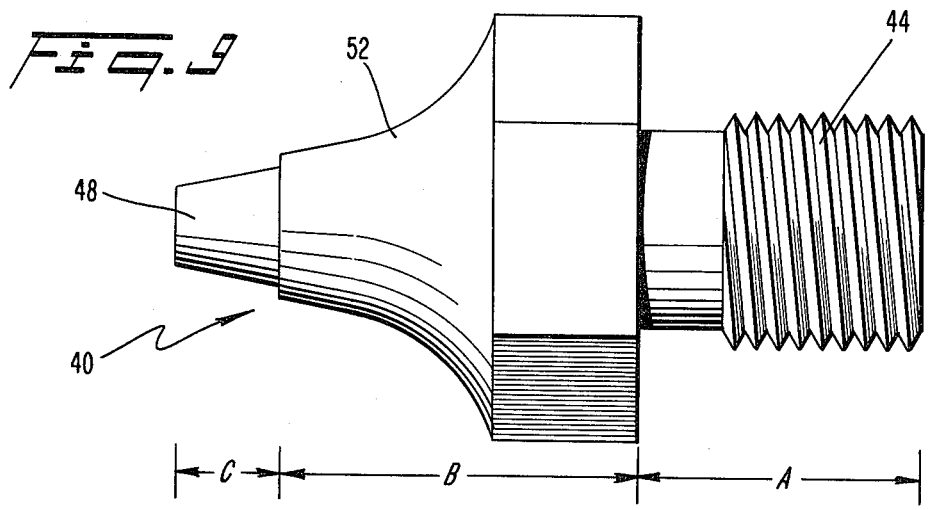
FIG. 9 is a side view of a third embodiment of the invention.
Figure 10:
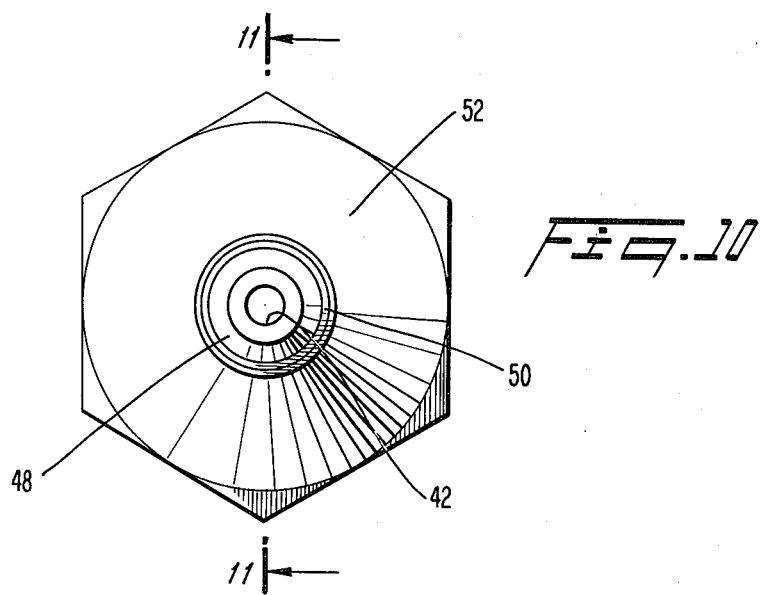
FIG. 10 is a front view of the third embodiment of the invention.
Figure 11:
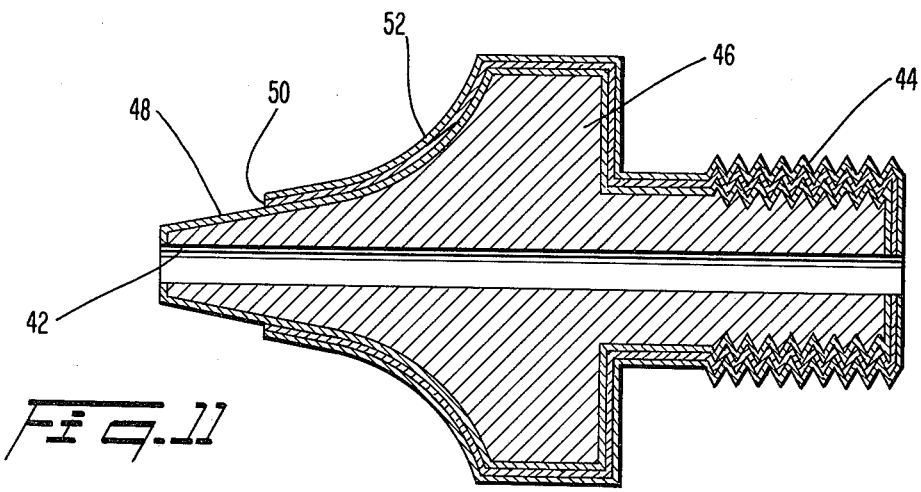
FIG. 11 is a cross-section of the third embodiment of the invention.

FIGS. 9 through 11 illustrate an embodiment of a de-soldering tip 40 made according to the invention. The de-soldering tip 40 includes an attachment portion A, an intermediate portion B adjoining the attachment portion A, and a solder-wetting portion C adjoining the intermediate portion B. The tip 40 includes a central tubular vacuum passage 42, and the attachment portion A includes mounting threads 44. In use, the de-soldering tip 40 is threaded onto a de-soldering tool, which is well-known in the art. In operation, the tip is heated and then brought into contact with solder which the operator desires to remove from a circuit. A vacuum source is connected to the vacuum passage 42 so that as the solder is melted, the melted solder is drawn off through the tube 42.

The de-soldering tip 40 shown in FIG. 11 has an integral carbon-based body 46 and includes a coating of iron 48 formed over the entire exterior body of the tip. A coating of nickel plating 50 is formed over the iron coating 48 along the intermediate portion B and the attachment portion A, but not along the solder-wetting portion C. Finally, a coating 52 of chromium is formed over the nickel plating 50 along the intermediate portion B and the attachment portion A, but not along the solder-wetting portion C. The coatings are the same coatings used on the soldering tips previously described and serve the same purposes. If it is desired to coat the de-soldering tip 46 by a barrel coating process, an additional dull nickel coating would first be plated directly on the carbon-based body by a rack plating process, and the additional coatings would be made by a barrel coating process.

In the de-soldering tip 40, the wall of the tubular vacuum passage 42 is uncoated, bare carbon. The melted solder will not adhere to this carbon, and therefore it is unnecessary to plate the passage or place a stainless steel tube in the passage.

The soldering and de-soldering tip of the present invention provides several benefits not found in commercial copper soldering and de-soldering tips. First, the carbon-based body is not prone to oxidation or dissolving. Because of these characteristics, the carbon-based body will not cavitate or oxidize at points of discontinuity or wear in the metal coatings. The tip of the present invention, therefore, eliminates the problems of pitting, heat transfer loss by oxidation, and freezing by oxidation. The present invention also provides a longer lasting tip at a lower cost. As will be described below, the carbon-based tip can be coated more quickly than copper, and the porous material of the carbon-based tip absorbs impurities in the plating baths and results in a more defect-free plating job.

The presently preferred method of making the soldering and de-soldering tips will now be described. First, a tip is machined to the desired shape by a typical machining element such as a lathe or turning machine. It has been found that the preferred carbon-based materials are easily adaptable to such machining. Due to the production of dust during machining, special dust collecting equipment should be used.

In the preferred process, after the carbon-based is formed, the desired coatings are electroplated on the base by a rack or barrel coating process, or a desired combination of both. Both of these coating processes ae well-known in the art. The preferred process depends upon the availability of coating machinery, the number of tips to be produced, and the economics of operation.

If the tips are to be coated by a rack coating process, the tips are first electroplated with a coating of iron through the use of a common iron plating bath, such as iron Fluoroborate. Next, a coating of nickel is electroplated over the iron coating, and finally a coating of chrome is electroplated over the nickel coating. Plating baths for electroplating nickel and chrome are well-known.

After the chrome electroplating, the nickel and chrome coatings are stripped from the solder-wetting portion of the tip to expose the iron coating as the wetting surface. If desired, the nickel and chrome coatings, can also be stripped from the attachment portion of the tips.

It is believed that the barrel coating process may be more economical than a rack coating process, particularly if the tips are produced on a large scale. If tips are to be made by the barrel coating process, it is preferable first to place a thin dull coating of nickel over the base by a rack coating process. This thin coating strengthens the pointed end of the tip so it will not break during the barrel coating process. The remaining steps of electroplating iron, nickel and chrome can be made in a barrel coating process. Then, at least the solder-wetting portion is stripped of any nickel or chrome coatings to expose the iron coating as a wetting surface.

The achieve the present preferred embodiment of the soldering tip shown in FIG. 4, at least two different procedures are possible. First, it is possible to coat the entire length of the tip and then strip any iron, nickel, and chrome coatings from the attachment portion of the soldering tip. In the alternative, the attachment portion can be masked during the electroplating process so that no coating is initially formed on the attachment portion of the carbon-based body.

Other embodiments of the invention will be apparent to those skilled in the art in consideration of the specification and practice of the invention disclosed herein. It is intended that the specification and examples be considered as exemplary only, and with a true scope and spirit of the invention being indicated by the following claims.

What is claimed is:

1. A tip for a soldering iron or a de-soldering tool comprising:
    a body of carbon-based material having an attachment portion, an intermediate portion adjoining said attachment portion, and a solder-wetting portion adjoining said intermediate portion,
    first means coated on at least said solder-wetting portion for providing a wettable working surface, and
    second means coated over at least said intermediate portion, but not said solder-wetting portion, for localizing the wettable working surface and impeding the upward flow of solder along said intermediate portion and toward said attachment portion.

2. The soldering tip of claim 1 wherein said first means is a coating of iron.

3. The soldering tip of claim 2 wherein said second means includes an exterior coating of chrome.

4. The soldering tip of claim 1 wherein said attachment portion is uncoated, bare carbon-based material.

5. The replaceable tip of claim 1 wherein said body of carbon-based material is formed of a material selected from the group consisting of pure carbon, carbon graphite, and pyrolytic carbon.

6. A replaceable soldering tip for a soldering iron having a tip-receiving bore and a temperature-sensing element extending within the tip-receiving bore comprising:
    a body of carbon-based material having an attachment portion for insertion into the tip-receiving bore, an intermediate portion adjoining said attachment portion, a solder-wetting portion adjoining said intermediate portion, and an elongated bore sized to receive snugly the temperature-sensing element of said soldering iron,
    first means coated on at least said solder-wetting portion for providing a wettable working surface, and
    second means coated over at least said intermediate portion, but not said solder-wetting portion, for localizing the wettable working surface and impeding the upward flow of solder along said intermediate portion and toward said attachment portion.

7. The replaceable tip of claim 6 wherein said attachment portion and the inner walls of said elongated bore are uncoated, bare carbon-based material.

8. A replaceable soldering tip for a soldering iron having a tip-receiving bore and a temperature-sensing element at the rear portion of the tip-receiving bore comprising:
    a body of carbon-based material having an attachment portion for insertion into the tip-receiving bore, an intermediate portion adjoining said attachment portion, and a solder-wetting portion adjoining said intermediate portion,
    a magnestat fixed to and extending from said attachment portion for contact with said temperature-sensing element;
    first means coated on at least said solder-wetting portion for providing a wettable working surface, and
    second means coated over at least said intermediate portion, but not said solder-wetting portion, for localizing the wettable working surface and impeding the upward flow of solder along said intermediate portion and toward said attachment portion.

9. A replaceable de-soldering tip for a de-soldering tool comprising:
    a body of carbon-based material having an attachment portion for joining with said tool, an intermediate portion adjoining said attachment portion, a solder-wetting portion adjoining said intermediate portion, and a central elongated vacuum passage formed along the length of said body for allowing the removal of melted solder, the wall of said passage being uncoated, bare carbon-based material.

10. The replaceable de-soldering tip of claim 9 further comprising:
   first means coated on at least said solder-wetting portion for providing a wettable working surface, and
   second means coated over at least said intermediate portion, but not said solder-wetting portion, for localizing the wettable working surface and impeding the upward flow of solder along said intermediate portion and toward said attachment portion.

11. A replaceable soldering tip for a soldering iron having a tip-receiving bore and a temperature-sensing element extending within the tip-receiving bore comprising:
   an integral body of carbon-based material having an uncoated, bare carbon-based material attachment portion for insertion into the tip-receiving bore, an intermediate portion adjoining said attachment portion, a solder-wetting portion adjoining said intermediate portion, and an elongated bore sized to receive snugly the temperature-sensing element of said soldering iron, the walls of said bore being uncoated, bare carbon-based material,
   a coating of iron plating formed over only said intermediate portion and said solder-wetting portion,
   a coating of nickel plating formed over said iron coating along only said intermediate portion, and
   a coating of chrome plating formed over said nickel coating only along said intermediate portion.

12. The replaceable tip of claim 11 further comprising a coating of dull nickel formed directly on said body of carbon-based material along said intermediate portion and said solder-wetting portion, wherein said coating of iron plating is formed on said dull nickel coating.

13. The replaceable tip of claim 11 wherein the coating of iron has a thickness in the range of 6 to 10 mils, the coating of nickel has a thickness in the range of 0.5 to 1 mils, and the coating of chrome has a thickness in the range of 0.5 to 1 mils.

14. A method of manufacturing tips for a soldering iron or de-soldering tool comprising the steps of:
   forming a tip body of a carbon-based material having an attachment portion, an intermediate portion adjoining said attachment portion, and a solder-wetting portion adjoining said intermediate portion,
   electroplating at least the intermediate portion and the solder-wetting portion with a coating of iron,
   electroplating at least the intermediate portion with a coating of nickel over said iron coating,
   electroplating at least the intermediate portion with a coating of chrome over said nickel coating, and
   stripping the solder-wetting portion of any nickel or chrome coatings to expose the iron coating as a wetting surface.

15. The method of claim 14 further comprising the step of stripping all coatings on the attachment portion to expose an uncoated, bare carbon-based material surface.

16. The method of claim 14 further comprising the step of electroplating directly on the body of carbon-based material a coating of dull nickel along at least the intermediate portion and the solder-wetting portion, prior to the step of electroplating with a coating of iron.

17. A method of manufacturing soldering tips for a soldering iron having a tip-receiving bore and a temperature-sensing element extending within the tip-receiving bore comprising:
   forming a soldering tip body of carbon-based material having an attachment portion for insertion into the tip-receiving bore, an intermediate portion adjoining said attachment portion, a solder-wetting portion adjoining said intermediate portion, and an elongated bore sized to receive snugly the temperature-sensing element of the soldering iron,
   electroplating at least the intermediate portion and the solder-wetting portion with a coating of iron,
   electroplating at least the intermediate portion with a coating of nickel over said iron coating,
   electroplating at least the intermediate portion with a coating of chrome over said nickel coating,
   stripping the solder-wetting portion of any nickel or chrome coatings to expose the iron coating as a wetting surface, and
   stripping all coatings on the attachment portion and the walls of the elongated bore to expose uncoated, bare carbon-based material surfaces.

18. A method of manufacturing de-soldering tips for a de-soldering tool having a tip-receiving bore and a vacuum source for removing melted solder comprising:
   forming a de-soldering tip body of carbon-based material having an attachment portion for insertion into said tip-receiving bore, an intermediate portion adjoining said attachment portion, a solder-wetting portion adjoining said intermediate portion, and a central elongated vacuum passage formed along the length of said tip for allowing removal of melted solder,
   electroplating at least the intermediate portion and the solder-wetting portion with a coating of iron,
   electroplating at least the intermediate portion with a coating of nickel over said iron coating,
   electroplating at least the intermediate portion with a coating of chrome over said nickel coating, and
   stripping all coatings on the wall of the elongated vacuum passage to expose uncoated, bare carbon-based material surface.

* * * * *